United States Patent
Bianchi et al.

(10) Patent No.: US 9,004,013 B2
(45) Date of Patent: Apr. 14, 2015

(54) GUN DOG TRAINING TOOL AND METHOD

(71) Applicant: EB Partners, Austin, TX (US)

(72) Inventors: James C. Bianchi, Karnes City, TX (US); Robert W. Holland, Austin, TX (US)

(73) Assignee: EB Partners, Austin, TX (US)

( * ) Notice: Subject to any disclaimer, the term of this patent is extended or adjusted under 35 U.S.C. 154(b) by 122 days.

(21) Appl. No.: 13/766,322

(22) Filed: Feb. 13, 2013

(65) Prior Publication Data

US 2014/0224186 A1  Aug. 14, 2014

(51) Int. Cl.
*A01K 15/02*  (2006.01)

(52) U.S. Cl.
CPC ........................ *A01K 15/02* (2013.01)

(58) Field of Classification Search
USPC .......... 119/707, 709–711, 51.01, 57.91, 61.2; 124/65, 66; 434/16; 446/401, 473
See application file for complete search history.

(56) References Cited

U.S. PATENT DOCUMENTS

| | | | |
|---|---|---|---|
| 3,871,334 A * | 3/1975 | Axelrod .................... 119/710 |
| 3,951,038 A * | 4/1976 | Van Langenhoven ............. 89/7 |
| 5,584,805 A * | 12/1996 | Sutton .............................. 604/60 |
| 5,947,738 A * | 9/1999 | Muehle et al. .................. 434/16 |
| 6,401,665 B1 * | 6/2002 | Gentile .......................... 119/707 |
| 6,681,721 B1 * | 1/2004 | Buschy .......................... 119/709 |
| 6,694,658 B1 * | 2/2004 | Marsac ............................ 42/54 |
| 2002/0017759 A1 * | 2/2002 | McClung et al. ............. 273/317 |
| 2003/0073056 A1 * | 4/2003 | Kim ................................ 434/16 |
| 2004/0111053 A1 * | 6/2004 | Nicolette ........................ 604/59 |
| 2006/0213453 A1 * | 9/2006 | Conrady ....................... 119/707 |
| 2007/0056517 A1 * | 3/2007 | Caveza ...................... 119/51.01 |
| 2008/0022990 A1 * | 1/2008 | Mitchell ......................... 124/65 |
| 2008/0314331 A1 * | 12/2008 | DeGhionno .................. 119/709 |
| 2013/0133581 A1 * | 5/2013 | Anderson et al. .......... 119/51.01 |
| 2013/0239937 A1 * | 9/2013 | Macri et al. ..................... 124/56 |
| 2014/0311470 A1 * | 10/2014 | Sievers ............................. 124/7 |

* cited by examiner

*Primary Examiner* — David Parsley
*Assistant Examiner* — George Andonyan
(74) *Attorney, Agent, or Firm* — Terrile, Cannatti, Chambers & Holland, LLP; Robert W. Holland

(57) ABSTRACT

A gundog training tool prevents gun shyness by gradually allowing a pup to adapt to the sound of a gunshot. A pop gun shoots treats upon creating a simulated gunshot so that the dog grows used to the sound of a gunshot and creates positive reinforcement rewarded by the treat. As the pup learns, a charge in a housing is introduced to provide a simulated gunshot that expels a treat that trains the dog to feel excitement at the sound and smell of a gunshot. The size of the charge adjusts to create louder simulated gunshots as the pup learns so that the pup is prepared for introduction to actual gunshots, such as from a shotgun shooting at a bird.

17 Claims, 2 Drawing Sheets

GUN DOG TRAINING TOOL AND METHOD

BACKGROUND OF THE INVENTION

1. Field of the Invention

The present invention relates in general to the field of dog training, and more particularly to a gun dog training tool and method.

2. Description of the Related Art

Kali Bianchi recently completed an upland game bird grand slam. Kali is a French Brittany, L'Epagneul Breton. Her story is captured in "It's all about the Dog," published in the *Publication of the Club de l'Epagneul Breton of the United States*, Second Semester 2012, Issue 35. In order to achieve her feat, Kali first had to overcome a case of gun shyness brought on when a handful of dove hunters thoughtlessly opened fire near her as a young pup. Kali cowered under a truck at the first report of a shotgun, her hunting prowess nearly nipped in the bud. Kali recovered through love and care to become a natural gun dog, however, many promising gun dog pups share her story. In south Texas, as in many rural areas, folks shoot guns so dogs had better be accustomed to the sound no matter how young. Pups that do not become familiar with and accepting of gunshots at an early age risk development of gun shyness if sudden proximate gunshots ring out. By the time a watchful, loving owner intervenes, the damage is often done. Yet, trainers tend to avoid exposing young pups to gunshots until the pups also train on live birds, typically at 6 months of age. Trainers fire .22 caps during bird flushes so that gun dogs grow used to the sound of a gunshot. Gun dogs inadvertently exposed to gunshots before that time typically do not have any training to prevent gun shyness. U.S. Pat. No. 2,851,991 by Rinck attempts to address gun shyness by shooting a projectile with bird scent out of a shotgun, however, shotguns create a loud noise that will likely induce gun shyness unless a pup has some prior training. Further, pup owners who live in urban areas generally cannot disturb neighbors and the local police by shooting pistols and shotguns in the yard for their pup.

SUMMARY OF THE INVENTION

Therefore a need has arisen for a system, apparatus and method which adapt a dog to gunshots to prevent gun shyness.

In accordance with the present invention, a system and method are provided which substantially reduce the disadvantages and problems associated with previous methods and systems for training a gun dog to adapt to gunshots without gun shyness. Simulation of a gunshot initiates presentation of a treat to the dog as positive reinforcement in a manner that adapts the dog to gunshots at a young age. Simulation of a gunshot is provided by pressurized air or an explosive charge, which initiates presentation of the treat so that the dog is trained to relate gunshots with treats.

More specifically, in one embodiment, a pop gun having a pump action pressurizes air in a chamber until the pressure overcomes a plug at an end of the chamber. The pressurized air forces the plug to pop free, thus creating a simulated gunshot sound. As the plug pops free, a treat coupled to the plug shoots outward for consumption by a puppy. The sharpness and loudness of the simulated gunshot is adjusted by altering the size of the chamber and/or force applied with the pump action so that the amount of noise associated with shooting the treat adjusts. Young pups under initial training receive quieter simulated gunshots; older pups accustomed to the quieter simulated gunshots receive gradually increased loudness to provide increased familiarization with the gunshot noise. In an alternative embodiment, a gunpowder charge disposed in a container is set off to simulate a gunshot and present the treat. For example, a charge and container similar to a champagne party popper is set off by pulling a string to shoot off treats for the pup to enjoy. The size of the charge increases as the pup becomes accustomed to the sound of the gunshot. In order to build association with a gun, the container couples to the pop gun so that the string or another charge initiator is pulled by the pop gun pump action. As the pups training progresses, the container couples to an actual shotgun with a length of string or other initiation device that allows a trainer to simulate a shotgun action.

The present invention provides a number of important technical advantages. One example of an important technical advantage is that a pup is trained to handle gunshots starting at a young age. Treats, such as dried liver formed into a ball or rice paper laced with beef broth, excite the pup so that the introduction of simulated gunshots do not cause trauma associated with gun shyness. As the pup grows accustomed to gunshots simulated at a certain noise level, the noise level is increased until the pup is prepared for introduction to actual gunshots. Initial simulated gunshot loudness levels fall within a range that an understanding wife will tolerate in the home so that city residents can prepare their pups for trips to the country. In addition to exciting the pup when the pup hears gunshots, other stimuli may be included, such as cordite to simulate the smell of a gunshot or bird down and/or other feathers to accustom the pup to the smell of selected game birds, such as a selected species of bird that a trainer intends to hunt.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Gunshot simulation presented to a pup in a controlled manner and reinforced with a treat in real time trains the pup to adapt to gunshots during hunting or other situations, such as for police or military work. Volume control that allows a series of gunshot simulations with increasing loudness provide a pup with gradual adaptation to gunshot noise so that gun shyness is avoided. Other stimuli included with the gunshot simulation help to prepare the pup for real life situations involving the use of weapons, such as the inclusion of game bird down and cordite to prepare for bird hunting. In one example embodiment, the gunshot delivery unit resembles a shotgun to facilitate the dog's recognition of the gun as a positive item, meant to deliver positive results.

Figure 1:
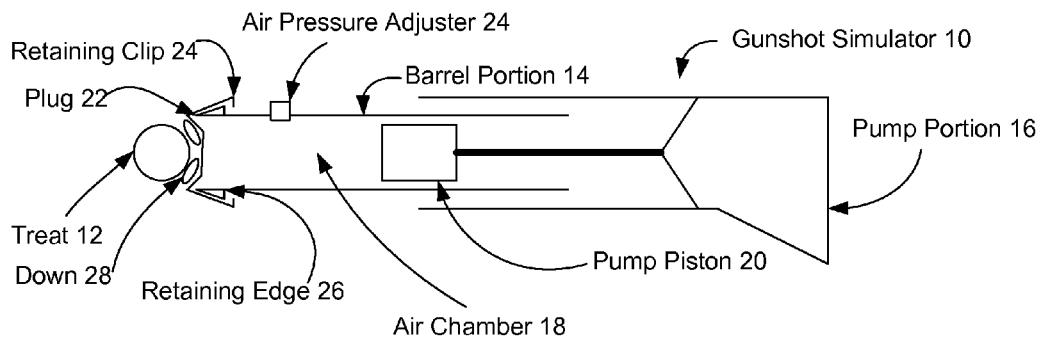
FIG. 1 depicts a side cutaway view of gunshot simulator having a treat disposed for expulsion.

Referring now to FIG. 1, a side cutaway view depicts a gunshot simulator 10 having a treat 12 disposed for expulsion at substantially the same time as a gunshot simulation is created. Gunshot simulator 10 has a form factor of a pump shotgun and is similar to a pop gun shooting toy sold by Cabelas under item code IK-615030. Treat 12 is a dog treat having a taste and smell that excites a pup, such as dried beef liver. In the example embodiment, treat 12 is exposed before activation of gunshot simulator 10 to simulate a gunshot so that the pup will learn that hearing the gunshot simulation means receiving treat 12.

Gunshot simulator 10 has a barrel portion 14 and a pump portion 16. Barrel portion 14 forms an air chamber 18 that accepts a pump piston 20. Movement of pump portion 16 translates to move pump piston 20 within air chamber 18. Plug 22 closes off barrel portion 14 so that movement of pump piston 20 towards plug 22 generates air pressurization within air chamber 18. As air pressure within air chamber 18 increases, it overcomes the retention force holding plug 22 onto barrel portion 14, thus resulting in plug 22 popping free with a sound that simulates a gunshot. The loudness of the simulated gunshot varies based upon the amount of pressurization released when plug 22 releases from barrel portion 14. A user can vary pressurization by varying the force applied to pump portion 16, by varying the amount of motion of pump piston 20 in air chamber 18, by adjusting the retention force holding plug 22 in barrel portion 14 and by changing a setting of an air pressure adjuster 24, which selectively allows air to escape from air chamber 18 during pressurization.

Plug 22 releaseably couples to the end of barrel portion 14 to have a desired retaining force that, when overcome, results in a simulated gunshot of a desired loudness. For instance, plug 22 has a retaining clip 24 that engages with a retaining edge 26 of barrel portion 14 until a desired retaining force is overcome with air pressurization created in air chamber 18 by the sliding of pump piston 20 towards plug 22. When plug 22 releases, treat 12 is expelled from its position at plug 22. In addition, game bird down 28 disposed between plug 22 and treat 12 is expelled. In one embodiment, treat 12 is dried beef liver formed in a ball that bounces and rolls so that a pup will find the treat exciting. In another embodiment, game bird down 28 is selected from a species of game bird that the pup under training is intended to hunt, such as pheasant, quail, partridge, etc. . . . In another embodiment, the retaining force at plug 22 is adjusted by adjusting the interaction of retaining clip 24 and edge 26, such as by increasing or decreasing an overlap that air pressurization overcomes to expel treat 12.

Figure 2:
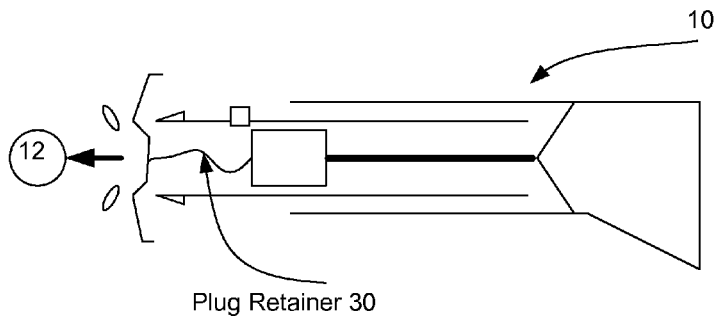
FIG. 2 depicts the gunshot simulator actuated to expel the treat.

Referring now to FIG. 2, the gunshot simulator 10 of FIG. 1 is depicted after actuation to expel the treat 12. Plug 22 has articulated portions that cooperate to act as a treat retainer when inserted in barrel portion 14 but that move relative to each other to release treat 12 when plug 22 is motivated out of its position in barrel portion 14. Articulation of portions of plug 22 relative to each other includes an expelling force on treat 12 when plug 22 releases from barrel portion 14. In one embodiment, down 28 released with treat 12 includes cordite that simulates the smell of a gunshot. A plug retainer 30 couples to pump piston 20 and plug 22 so that sliding of pump piston 20 away from plug 22 reinserts plug 22 into position in barrel portion 12. In alternative embodiments, alternative types of treat dispositions may be used at the creation of a simulated gunshot as may alternative arrangements for creating an air pressurization that motivates treat 12. In one embodiment, treat 12 acts as plug 22 by having a size that blocks the opening of barrel portion 14 so that a plug retainer is not necessary. When treat 12 also acts as plug 22, the size of treat 12 may create a retaining force or an additional mechanism may keep treat 12 in place until a desired pressurization has built in air chamber 18. In one alternative embodiment, plug 22 is edible for one time use with treat 12.

Figure 3:
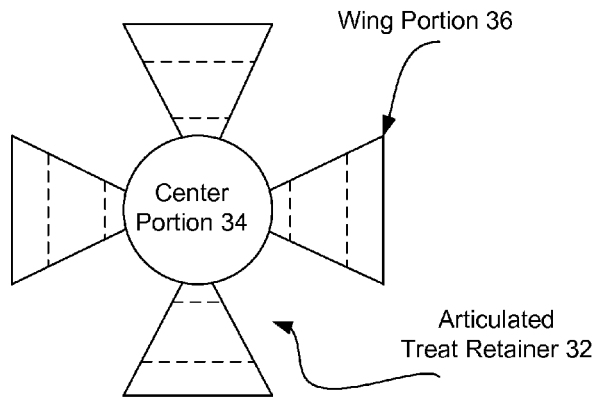
FIG. 3 depicts a top view of an articulated treat retainer.

Referring now to FIG. 3, a top view depicts an articulated treat retainer 32 formed into a plug 22. Treat 12 rests against a center portion 34 and is held in place by wing portions 36 that rotate around the dotted line indications to partially enclose treat 12. Wing portions 36 are held in place around treat 12 when plug 22 is inserted in barrel portion 14 and allowed to release when plug 22 is expelled from barrel portion 14. In one example embodiment, treat retainer 32 is a flexible plastic material having less thickness where movement is indicated to allow articulation about treat 12.

Figure 4:
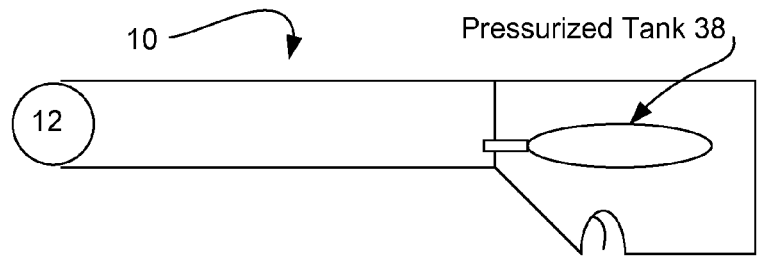
FIG. 4 depicts a gunshot simulator having a pressurized tank for creating a gunshot simulation that motivates a treat.

Referring now to FIG. 4, a gunshot simulator 10 is depicted having a pressurized tank 38 for creating a gunshot simulation that motivates a treat. For example, pressurized tank 38 is a CO2 cartridge commonly used to shoot pellets from pellet guns. Treats 12 insert into an opening of barrel portion 14 or at the end of barrel portion 14 and are expelled upon release of pressurized air from pressurized tank 38 into air chamber 18. The release of pressurized air creates a gunshot simulation or, alternatively, a gunshot simulation is provided with an explosive cap set off by the release or with a popper that reacts to the pressurized air.

Figure 5:
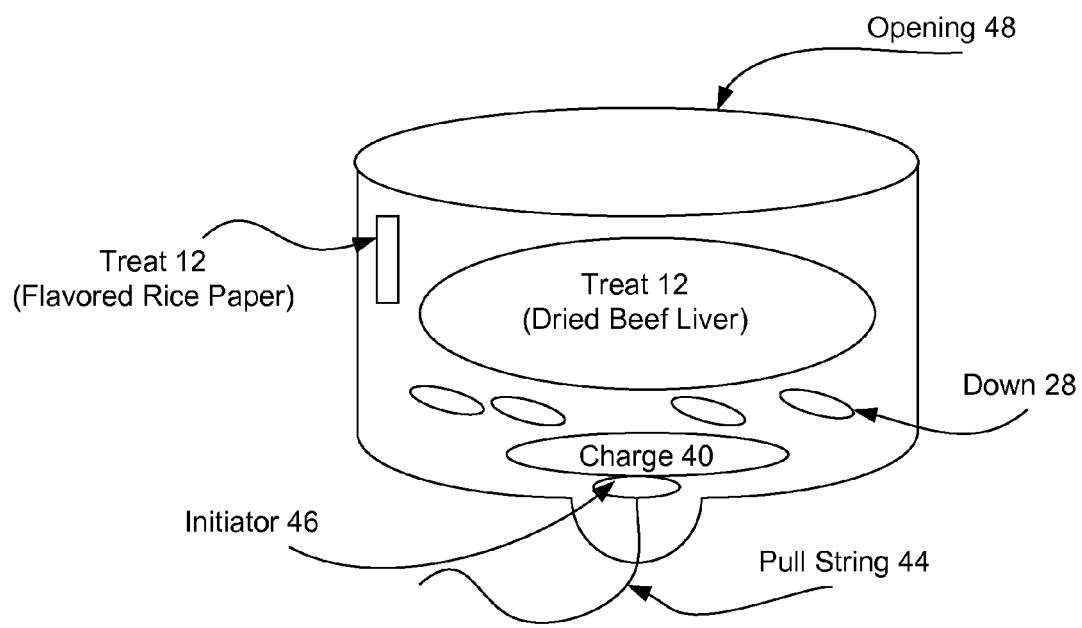
FIG. 5 depicts a gunshot simulator having a charge in a housing to simulate a gunshot and expel a treat.

Referring now to FIG. 5, a gunshot simulator 10 is depicted having a charge 40 in a housing 42 to simulate a gunshot and expel a treat 12. Gunshot simulator 10 is sized to fit in a trainers hand much like a conventional champagne party popper. Charge 40 is a gunpowder charge or a pressurized air charge that is set off when a trainer pulls on a string coupled to an initiator 46. Species selectable game bird down 28 pads treat 12 to provide the pup with an audible gunshot simulation, a treat for consumption and bird scent for additional stimulation. Treat 12 is motivated out of opening 48 by initiation of charge 40. In one embodiment, treat 12 is a ball of dried beef liver that bounces and rolls to excite a pup. Alternatively or in addition, treat 12 may be rice paper flavored with broth to float on air after being expelled from opening 48. In alternative embodiments, other types of starch compounds having characteristics of confetti may be used with other types of flavorings attractive to a pup. In use, a trainer may allow the pup to smell the treat to get the pup excited and then hold the housing 42 away from the pup for initiation of charge 40. Once the pup becomes familiar with the housing 42 and associates its presentation with a treat, the trainer may bring housing 42 to a closer position to the pup for initiation. Further, the size of charge 40 may be altered to increase as a pup becomes familiar with the gunshot simulation. In one embodiment all or part of housing 42 may be formed from an edible material that is fed to the pup after initiation of charge 40 as an additional treat. In one alternative embodiment, charge 40 is set off without expelling a treat and the pup is fed edible housing 42 instead.

Figure 6:
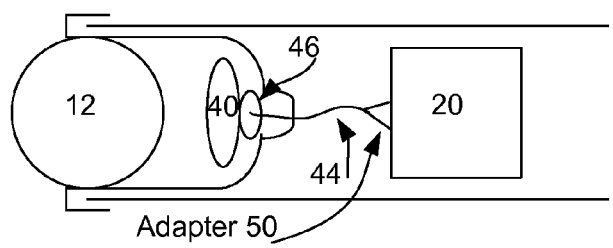
FIG. 6 depicts a gunshot simulator having an adapter to hold the housing of FIG. 5.

Referring now to FIG. 6, a gunshot simulator 10 is depicted having an adapter to hold the housing of FIG. 5. For example, housing 40 inserts into the barrel portion 14 of the gunshot simulator depicted by FIG. 1 so that initiator 46 is initiated by a movement of pump portion 16 relative to barrel portion 14. For instance, an adapter 50 couples pull string 44 to pump piston 20 to set off charge 40 by action of pump portion 16. The use of the adapter 50 allows initiation of charge 40 with a mechanism that the pup has become accustomed to from previous training A trainer can thus start the pup with gunshot training using pressurized air and then transition to gunpowder as the pup becomes accustomed to the gunshot simulation without causing the pup additional stress with a substantially new visual image or form factor.

Although the present invention has been described in detail, it should be understood that various changes, substitutions and alterations can be made hereto without departing from the spirit and scope of the invention as defined by the appended claims.

What is claimed is:

1. A dog training tool comprising:
    a gunshot simulator operable to generate a simulated gunshot, and the gunshot simulator formed to appear as a shotgun, the gunshot simulator having a housing to releaseably couple with the treat and an explosive charge disposed in the housing and operable to explode to create the simulated gunshot and pressurized air within the housing;
    a treat coupled to the gunshot simulator, the treat separated from the gunshot simulator by a force imparting motion to the treat, the force associated with the simulated gunshot pressurized air;
    a pressurized air adjuster operable to adjust the loudness of the simulated gunshot by adjusting the pressurized air created with the simulated gunshot; and
    game bird down disposed at the gunshot simulator to separate from the gunshot simulator by the force associated with the simulated gunshot.

2. The dog training tool of claim 1 wherein the gunshot simulator comprises:
    a barrel forming an air chamber, the air chamber having an open end that accepts a plug;
    a pump disposed in the air chamber at an end opposite the open end, the pump sliding within the air chamber and operable to create pressurized air when the pump slides towards the open end;
    a plug sized to fit in the open end and operable to create the simulated gunshot under the action of the pressurized air, the plug having a treat retainer to releaseably couple with the treat; and
    a plug retainer coupled to the pump and the plug to retract the plug into the open end when the pump slides in the air chamber away from the open end.

3. The dog training tool of claim 1 wherein the housing comprises an edible dog treat for feeding to the dog.

4. The dog training tool of claim 1 wherein the game bird down comprises a selectable species associated with intended hunting by the dog.

5. The dog training tool of claim 1 wherein the treat comprises a ball shape adapted to bounce and roll upon separation from the gunshot simulator.

6. The dog training tool of claim 1 wherein the treat comprises dried liver.

7. The dog training tool of claim 3 wherein the treat comprises starch paper flavored with broth, the starch paper floating in the air after the pressurized air imparts movement.

8. A dog training tool comprising:
    a barrel forming an air chamber, the barrel formed to appear as a shotgun, the barrel having a housing to releaseably couple with a treat;
    a pressurized air source in communication with the air chamber and operable to generate pressurized air, the pressurized air creating a simulated gunshot sound having a predetermined volume, the pressurized air source including at least an explosive charge that explodes to create the pressurized air;
    a pressurized air adjuster operable to adjust the loudness of the simulated gunshot by adjusting the pressurized air created with the simulated gunshot;
    game bird down disposed at the gunshot simulator to separate from the gunshot simulator by the force associated with the simulated gunshot; and
    a treat at least partially disposed in the barrel housing and interfaced with the pressurized air, the treat motivated out of the air chamber by the pressurized air.

9. The dog training tool of claim 8 wherein the pressurized air source comprises a sliding pump disposed in the air chamber that pressurizes air with movement through the air chamber.

10. The dog training tool of claim 8 wherein the pressurized air source comprises a pressurized $CO_2$ tank.

11. The dog training tool of claim 8 wherein the treat comprises dried liver formed in a ball sized to fit in the air chamber.

12. A dog training tool comprising:
    a housing having an opening, the housing formed to appear as a shotgun;
    an explosive charge disposed in the housing;
    a dog treat disposed proximate the opening;
    an initiator interfaced with the explosive charge and operable to initiate explosion of the explosive charge;
    a pressurized air adjuster operable to adjust the loudness of the simulated gunshot by adjusting the pressurized air created with the simulated gunshot; and
    game bird feathers disposed in the housing to expel from the housing with the treat;
    wherein the explosive charge explodes to simulate a gunshot and generate pressurized air in the housing, the pressurized air expelling the dog treat and game bird feathers from the opening.

13. The dog training tool of claim 12 wherein the housing comprises a dog treat edible by the dog after the charge initiates.

14. The dog training tool of claim 12 wherein the treat comprises dried liver.

15. The dog training tool of claim 12 wherein the treat comprises flavored paper operable to float in air after being expelled from the opening.

16. The dog training tool of claim 12 wherein the explosive charge comprises gunpowder.

17. The dog training tool of claim 12 wherein the explosive charge is a party popper firecracker charge.

* * * * *